United States Patent
Cadez et al.

[11] 3,899,722
[45] Aug. 12, 1975

[54] PLASTICS-INSULATED SWITCH UNIT FOR MULTI-PHASE HIGH-VOLTAGE SWITCHGEAR INSTALLATIONS WITH EARTHING CONTACT

[75] Inventors: August Cadez, Wettingen; Rolf Schaumann, Wurenlos, both of Switzerland

[73] Assignee: BBC Brown Boveri & Company Limited, Baden, Switzerland

[22] Filed: July 1, 1974

[21] Appl. No.: 484,856

[30] Foreign Application Priority Data
July 12, 1973 Switzerland.................... 10207/73

[52] U.S. Cl............................. 317/103; 200/50 AA
[51] Int. Cl...................... H02b 11/04; H01h 31/04
[58] Field of Search..... 200/307, 275, 50 AA, 48 R, 200/148 R, 148 D; 317/103

[56] References Cited
UNITED STATES PATENTS
3,188,415   6/1965   Netzel.......................... 200/50 AA
3,356,798   12/1967   McKinnon...................... 200/48 R

*Primary Examiner*—Gerald P. Tolin
*Attorney, Agent, or Firm*—Pierce, Scheffler & Parker

[57] ABSTRACT

A plastics-insulated switch unit for multi-phase high-voltage switchgear installations includes a frame made from a plastic material such as moulded synthetic resin in a solid or foam state providing parallel spaced cylindrical recesses for the respective phases for receiving plug-in type cylindrical switching modules which are ganged together for common operation. The recesses are provided with longitudinally spaced internal ring-shaped contact pieces which cooperate with external ring-shaped counter contact pieces provided on the switching modules and one of the ring-shaped contact pieces in each recess is earthed so as to provide an automatic earthing connection for all of the switching modules when in the withdrawn position.

6 Claims, 7 Drawing Figures

PLASTICS-INSULATED SWITCH UNIT FOR MULTI-PHASE HIGH-VOLTAGE SWITCHGEAR INSTALLATIONS WITH EARTHING CONTACT

The invention concerns a plastics-insulated switch unit for multi-phase high-voltage switchgear installations in which the switching devices are in the form of plug-in modules arranged one above the other in accordance with the phases.

It is known from German published patent specification DT-AS 1 210 068 that, in order to achieve high-voltage switchgear installations of narrow dimensions, these can be constructed of moulded-resin-insulated switch units of such a form that within the respective switch units the phases are arranged one above the other. With this known method of construction, however, it is not possible to employ switchgear of the drawout type, thus dispensing with isolator switches, nor to use the switching devices for earthing system components by moving the devices to the withdrawn position (cf. for example, Swiss Patent No. 497,057).

The principal object of the present invention is to establish a manner of construction for the switch unit mentioned above, such that drawout-type switchgear in the form of plug-in modules within the switch unit can be easily used for earthing purposes. This object is achieved in that the switch-unit frame for the plug-in modules incorporates recesses having on their inside fixed, ring-shaped contact pieces, and that the plug-in modules have corresponding counter contact pieces on their outer surface. The new arrangement not only has the advantage of narrow dimensions, but in particular behaves favorably in response to dynamic current forces such as can occur in the event of a short circuit.

Examples of the invention are shown in the accompanying drawings, in which:

FIG. 3 shows in plan view three switch units according to FIG. 1 arranged side-by-side, while

Figure 1:
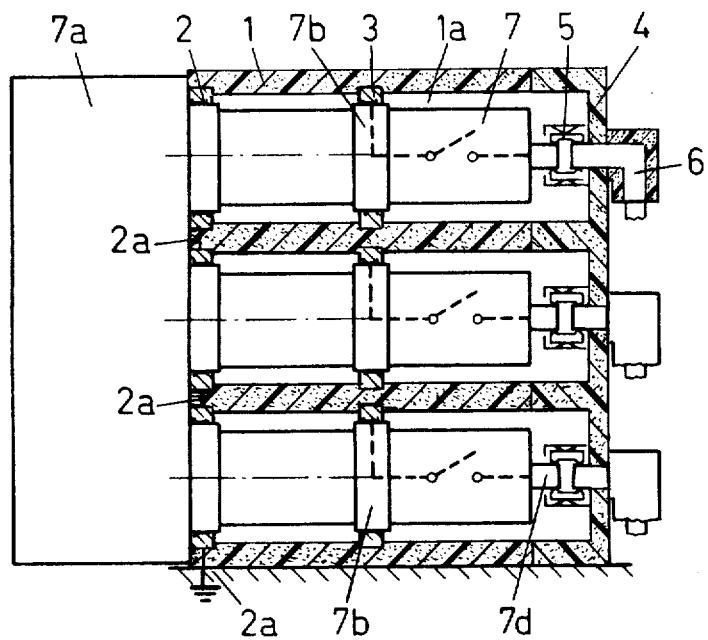
FIG. 1 shows a switch unit in side elevation, partly in section, with the drawout switching device in the operating position (fully inserted)

In all of the figures, corresponding parts are identified by the same reference numbers. The switch unit frame 1 has three recesses 1a of cylindrical shape. Fixed, ring-shaped contact pieces 2, 3 are let into the inside wall. The switch unit frame 1 is closed on the right-hand side by a cover 4. This cover 4 contains plug-type contact pieces 5 which are joined at one end to the cable connections 6. At the other end they can be made to engage in a corresponding contact piece 7d of the drawout switching device denoted 7. The switching device 7 can be a load-break switch or a circuit-breaker, e.g. of the gas-operated type. Its three parallel projecting tubular poles have a common container 7a for the operating mechanism. A ring-shaped contact piece 7b is mounted on the outside of each of the tubular poles. The contact pieces 7b are in each case connected electrically to one side of the switching element, as shown schematically by the broken line. The other side of the switching element is connected electrically to the pin-shaped contact 7d which moves with the switch structure 7 and which, in the fully inserted position shown in FIG. 1, engages in the fixed contact 5. FIG. 2 illustrates the isolating position, in which an isolating distance is created between contacts 5 and 7d. Contacts 2 and 7b are then still engaged to provide an earth connection. With the version shown in FIGS. 1 and 2 the contact pieces 2 provided for earthing purposes are electrically joined together within the switch unit frame 1 by means of links 2a, and connected to earth. The switch unit can be stood directly on the floor and held in position by means of anchor bolts or fixed rails. The withdrawable 3-pole switching device 7 can also be mounted on a trolley, if required. In the isolating position shown in FIG. 2, the end with moving contact 7d can be earthed by closing the switching device 7. That part of the system at the end with the cable connections 6 can also be earthed if an electrically conducting connection (not shown) is fitted between contacts 5 and 7d. This can be done, for example, if the switching device 7 is first fully withdrawn from the switch unit.

Figure 2:
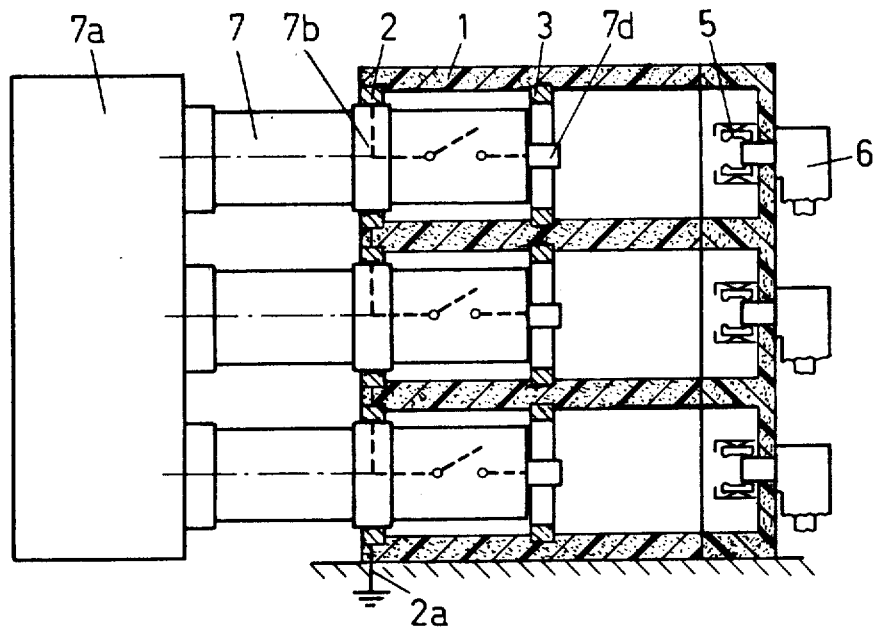
FIG. 2 shows the corresponding withdrawn position (isolating position) of the switching device.
Figure 3:
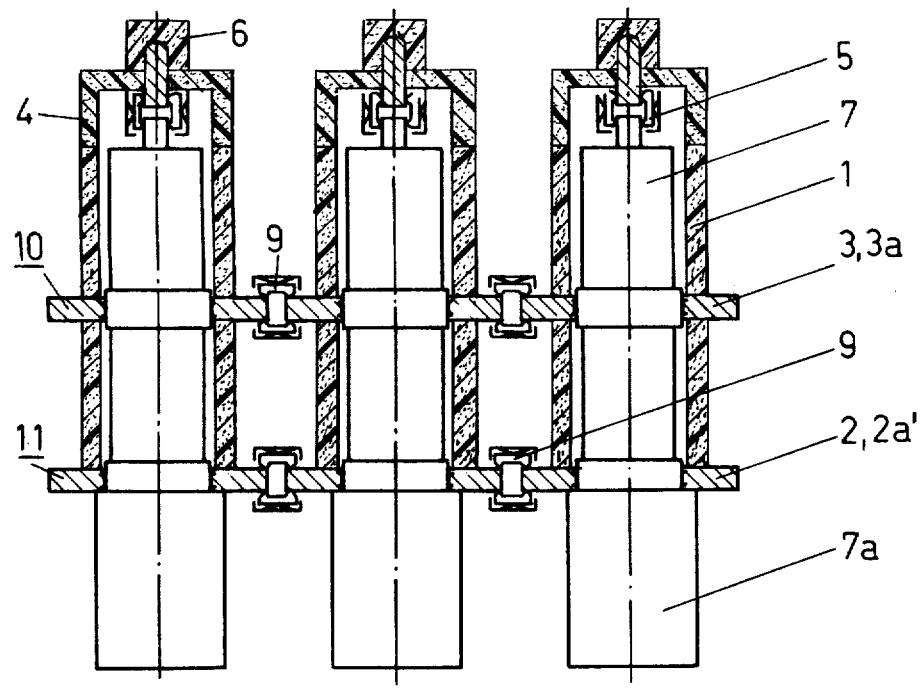
Figure 7:
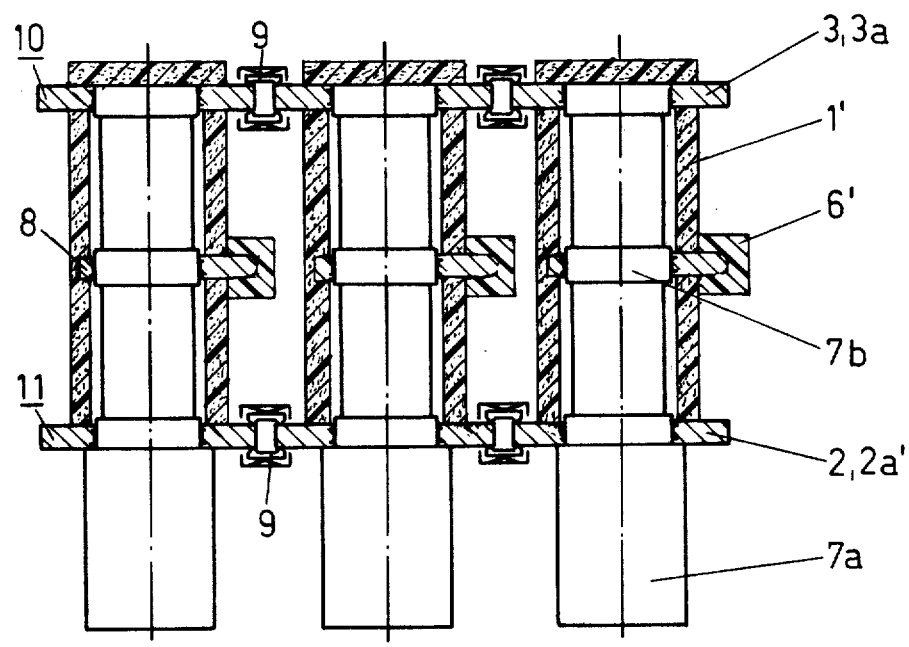
FIG. 7 shows in plan view three switch units corresponding to FIGS. 4 to 6, arranged side-by-side.

FIG. 3 shows in plan view the manner in which a number of multi-phase switch units of the type shown in FIG. 1 are joined together side-by-side to form a switching station. In this case the ring-shaped contact pieces 2 and 3 are provided with lateral pin-type extensions 2a, 3a. The adjacently positioned switch units are connected electrically to each other by means of tulip-type contacts 9. In this way, contacts 3, 3a combine to form a busbar 10. In a similar manner, contacts 2, 2a constitute a single or multi-phase earth bus 11. The switch unit 1 can be of moulded resin. The material can, however, also be a stable plastic foam. A polyurethane-based integral foam is particularly suitable from the standpoint of good mechanical and electrical properties. This results in favorable manufacturing possibilities since all the components to be embedded in the plastic can be placed in the foam mould, so that finishing operations are practically eliminated. As FIG. 7 shows, for example, each of the switch unit frames 1' can also be made in one piece.

Figure 4:
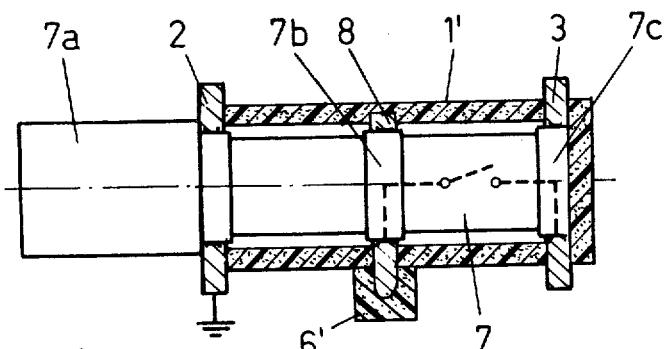
FIG. 4 to 6 show in plan view and single-phase form a variation of FIG. 1 in three characteristic positions, the ring-shaped contact pieces being arranged for a configuration with the outgoing cable feeder in the middle.
Figure 5:
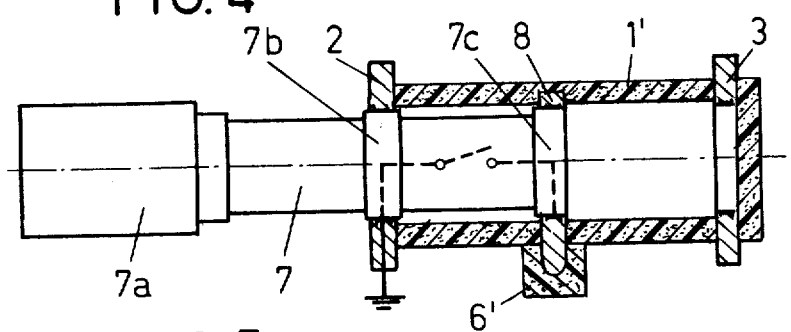
Figure 6:
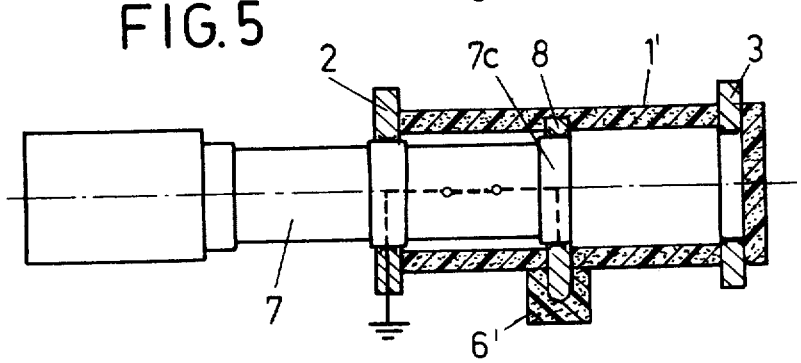

FIGS. 4 to 6 show a version slightly different from that in FIG. 1, in that contacts 3 (busbar) are incorporated in the switch unit frame 1' at the right-hand end. With the switching device in the fully inserted position these contacts function together with ring-shaped contacts 7c on the outside of the tubular pole. The cable connection 6' is in this case in the middle and joined to contact ring 8, which engages contact 7b when the switching device is fully inserted (FIG. 4). FIG. 5 shows the corresponding isolating position, when 2 is in contact with 7b, and 8 with 7c. If the switching device 7 is now closed (FIG. 6), cable connection 6' is also earthed. With this arrangement, no additional connections are required for earthing the part of the system linked to cable connections 6'. Finally, in the same way as FIG. 3, FIG. 7 shows three switch units 1' combined to form a switching station. Only the cable connections 6' and the busbar are in different positions. Laminated-strip contacts are preferred for providing contact between ring contacts 2, 3 and 8 in the switch unit frame, on the one hand, and the corresponding contacts 7b and 7c on the tubular pole on the other.

The new configuration has above all the advantage of behaving favorably in response to current forces, such as occur in the event of short circuits, for example, because the tubular pole of the switching device 7 is, in each case, located inside the appropriate contact rings. In addition, the use of foam insulation for the switch unit frame results in a lightweight, low-cost construction.

We claim:

1. A plastics-insulated switch unit in a multi-phase high-voltage switchgear installation comprising a frame made from a plastic material and including parallel spaced cylindrical recesses for the respective phases, each said recess being provided with at least two longitudinally spaced internal ring-shaped contact pieces, and plug-in type cylindrical switching modules correlated to said phases and recesses and each of which includes at least one external ring-shaped counter contact piece and which is alternatively engaged with one or the other of said internal ring-shaped contact pieces dependent upon whether the switching module is plugged into the recess or withdrawn therefrom, one of said ring-shaped contact pieces in each recess being earthed and providing an earth connection for the correspondingly positioned ring-shaped contact piece on the switching module when in the withdrawn position.

2. A plastics-insulated multi-phase switch unit as defined in claim 1 and which further includes means for electrically interconnecting the earthed ring-shaped contact pieces in all of said recesses.

3. A plastics-insulated multi-phase switch unit as defined in claim 1 wherein said frame is made from a rigid foam plastic.

4. A plastics-insulated multi-phase switch unit as defined in claim 1 wherein each said recess in the plastic frame is provided with a pair of internal longitudinally spaced ring-shaped contact pieces and each said switching module includes one external ring-shaped counter contact engageable alternatively with said internal ring-shaped contact pieces and a second external contact piece located at the inner end of the module and which is engaged with a counter contact piece located at the inner end of the recess when the switching module occupies its plugged-in position.

5. A plastics-insulated multi-phase switch unit as defined in claim 1 wherein each said recess in the plastic frame is provided with first, second and third internal longitudinally spaced ring-shaped contact pieces and each said switching module includes a pair of external ring-shaped counter contact pieces engaged with said first and second internal ring-shaped contact pieces when said switching module occupies its withdrawn position and engaged with said second and third internal ring-shaped contact pieces when said switching module occupies its plugged-in position.

6. A switching station comprising a plurality of multi-phase plastics-insulated switching units each as defined in claim 1 and which are located in side-by-side relation and interconnected electrically and establishing a bus by interconnecting adjoining externally projecting lateral extensions of said internal ring-shaped contact pieces.

* * * * *